(12) United States Patent
Walker

(10) Patent No.: US 9,376,817 B2
(45) Date of Patent: Jun. 28, 2016

(54) RAFTER CENTER TRANSLATION TOOL SET

(71) Applicant: Calvin Walker, Bridgeton, MO (US)

(72) Inventor: Calvin Walker, Bridgeton, MO (US)

(*) Notice: Subject to any disclaimer, the term of this patent is extended or adjusted under 35 U.S.C. 154(b) by 0 days.

(21) Appl. No.: 14/449,146

(22) Filed: Aug. 1, 2014

(65) Prior Publication Data

US 2015/0033572 A1    Feb. 5, 2015

Related U.S. Application Data

(60) Provisional application No. 61/958,580, filed on Aug. 1, 2013.

(51) Int. Cl.
*G01B 3/00* (2006.01)
*E04D 15/00* (2006.01)
*E04G 21/18* (2006.01)
*F24J 2/52* (2006.01)

(52) U.S. Cl.
CPC ............ *E04D 15/00* (2013.01); *E04G 21/1891* (2013.01); *F24J 2002/5281* (2013.01)

(58) Field of Classification Search
CPC ............... G01B 3/1084; G01B 2003/1087; G01B 2003/1089; G01B 2003/1092; G01B 2003/1094
USPC ............... 33/755, 757–760; 52/702, 712, 715
See application file for complete search history.

(56) References Cited

U.S. PATENT DOCUMENTS

| | | | | |
|---|---|---|---|---|
| 2,992,488 | A * | 7/1961 | Berrett | E04F 21/00 33/542 |
| 3,445,977 | A * | 5/1969 | Latiano | E06B 1/6015 49/505 |
| 4,329,783 | A * | 5/1982 | Maresca | G01B 3/02 33/542 |
| 6,173,505 | B1 * | 1/2001 | Munno | G01B 3/1071 33/760 |
| 6,931,813 | B2 * | 8/2005 | Collie | E04B 7/063 52/702 |
| 8,091,250 | B1 * | 1/2012 | Jinks | G01B 3/1056 33/758 |
| 8,448,348 | B1 * | 5/2013 | Jones | E04G 21/1891 33/612 |
| 2006/0288599 | A1 * | 12/2006 | Hajianpour | G01B 3/10 33/755 |

* cited by examiner

*Primary Examiner* — William Gilbert

(57) ABSTRACT

A Rafter Center Translation Tool Set 10 that when used with a standard 25 ft retractable tape measure 20 and a common 6 inch 7/32nd drill bit will provide for the translation of multiple vertically running horizontally displaced rafter centers from inside an accessible roof area where rafter rafters centers are visible, to outside a roof area on-top of a decking 3 above the shingles 4, requiring only two alignment holes for the translation of multiple centers along a 25 ft span. These centers are marked on a tape measures tape which is referenced and secured between a 1$^{st}$ Rafter Clip 1 and a horizontally displaced 2$^{nd}$ Rafter Clip 19 inside the roof area. The tape measures tape is then referenced and secured between an aligned 1$^{st}$ Translation Plate 15 and 2$^{nd}$ Translation Plate 18 on the outside of the roof, where the marked centers from the inside of the roof are now visible on the outside of the roof.

7 Claims, 6 Drawing Sheets

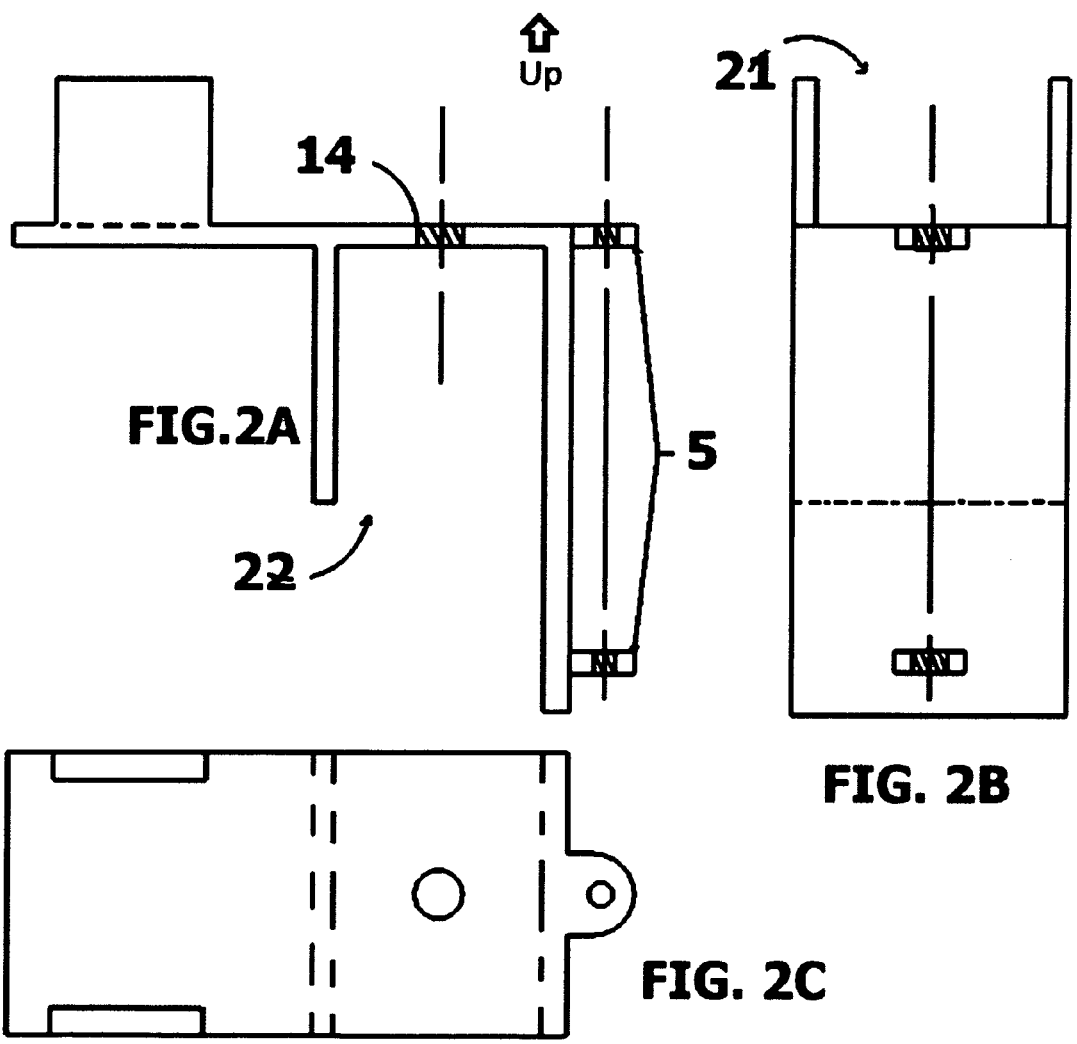

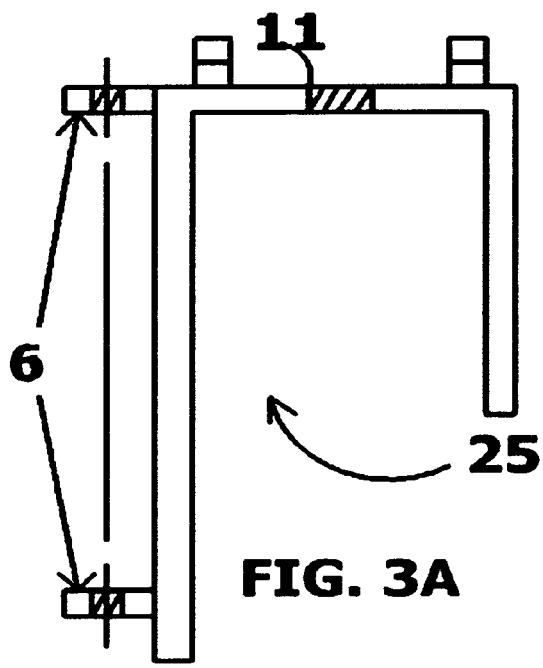
FIG. 3A
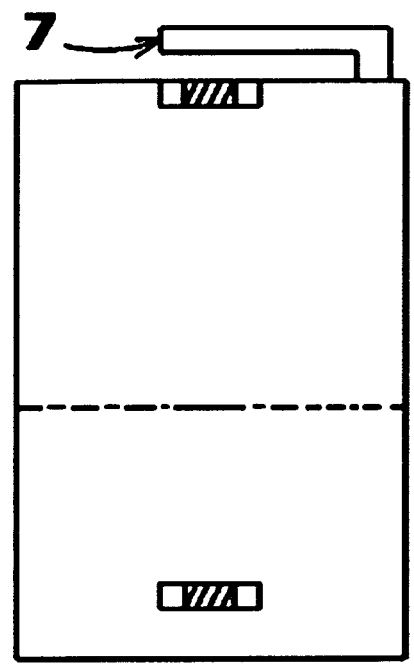
FIG. 3B
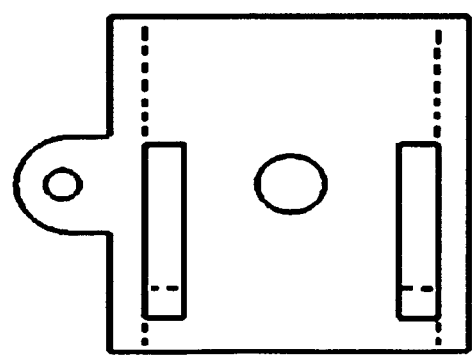
FIG. 3C
Up

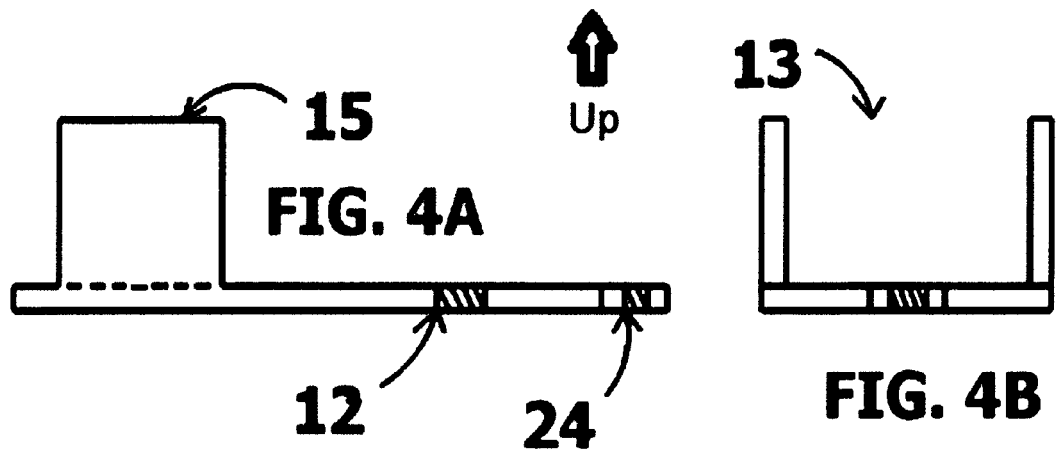
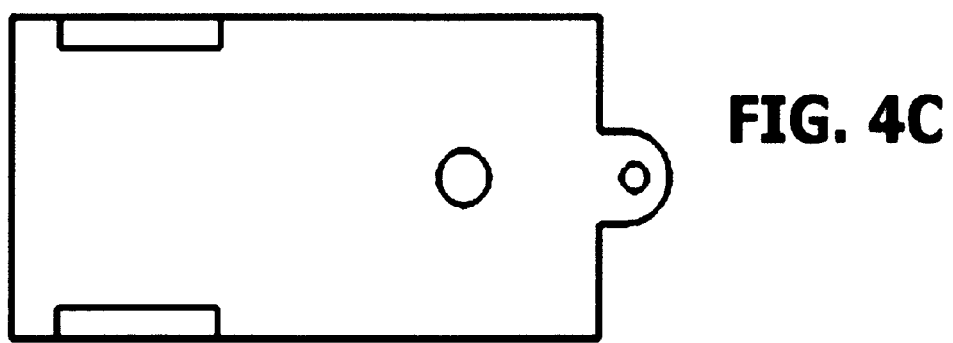
FIG. 4C

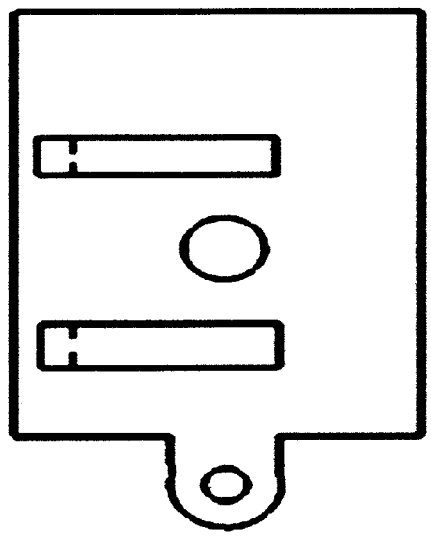
FIG. 5A
Up
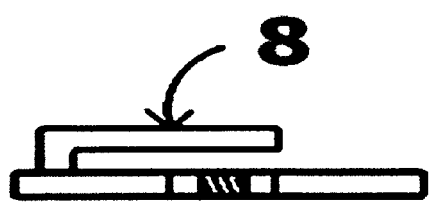
FIG. 5B
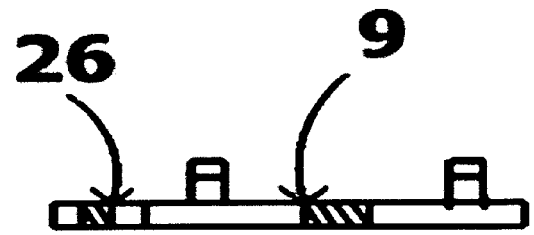
FIG. 5C

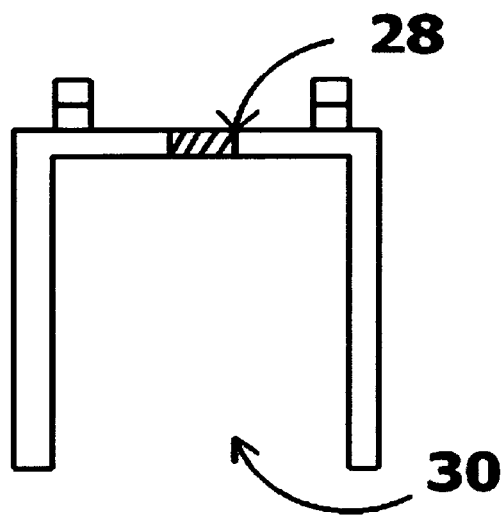
FIG. 6A
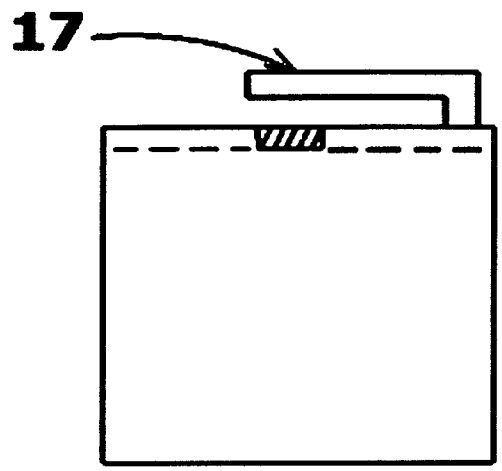
FIG. 6B
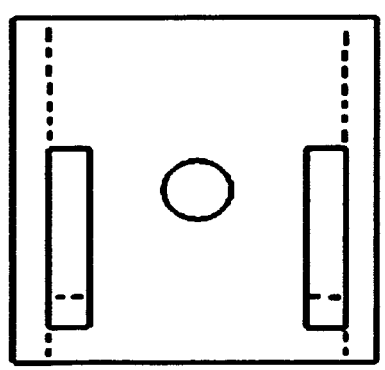
FIG. 6C

RAFTER CENTER TRANSLATION TOOL SET

CROSS REFERENCE TO RELATED APPLICATION

This non-provisional application claims priority to the provisional application for the Tru-Center Rafter Clip System Ser. No. 61/958,580 filed by the inventor Calvin Walker on Aug. 1, 2013.

Statement regarding federally sponsored research N/A.

FIELD OF INVENTION

This invention relates to hand tools or systems used to record multiple spaced points along a horizontal line and translate these recorded points along a linear distance perpendicular to a horizontal line. In Euclidean geometry, a translation is a function that moves every point a constant distance in a specified direction. A translation can be described as a rigid motion. A translation can also be interpreted as the addition of a constant vector to every point, or as shifting the origin of the coordinate system.

BACKGROUND OF THE INVENTION

An exemplary roof as shown in FIG. 1. consist of two primary components;

1) a roof covering 4 to shed water, most commonly asphalt/composite shingles, metal, tile or thatch material and, 2) a roof decking 3 to attach the covering to, most commonly ½ to ¾ inch thick plywood sheeting.

Roof rafters 2, serve to transmit the weight of the roof to the walls of the building, they are also used in the solar industry to structural attach a racking system to a roof, racking systems are generally a framework of two vertically separated rails for each row of panels that run horizontally across a roof, the solar panels or modules of an array are mechanically attached to the racking system and the racking system is structurally anchored to the rafters. Solar energy systems often seek to maximize their input one way this is done is by maximizing the area of the array and thus it is quite common for the array to be arranged in multiple rows, and cover most of a roofs area, this can require a great number of structural anchors. Rafters constructed from what is commonly referred to as 2×4s are widely used in the residential construction industry to provide structural support for a roof, and to also provide structural anchoring for anything that may be mounted to the roof. The geometry of a roof is such that the rafters of a roof run longitudinally from a roofs ridge, to the roofs edge and are spaced apart so that there longitudinal centers are commonly 16 inches apart, this is commonly referred to as having rafters on 16 inch centers, this center distance or spacing is not exact and it is quite common for some rafters to have more or less than the standard spacing. For a 24 ft span with 16 inch centers there will be 18 rafters, 16 will be intermediate meaning "in between" the first and the last rafter of the span, FIG. 1 shows a cut away view of a roof section with rafter's longitudinal centers 40. The problem is that these rafters or 2×4 s have a profile that is actually only 1½"×3½" in length, with the 1½" face supporting and underlying the roof decking and the 3½" face perpendicular to the decking, the longitudinal centers of these rafters will also be perpendicular to the decking, these centers are not easily located from the outside of a roof which in the case of residential roofs is also commonly covered with shingles/composition roofing material. With the growing interest in residential roof mounted solar energy systems, which require the structural attachment of racking systems to the center of this underlying 1½" face for the proper and approved mounting of solar systems, there is also a greater interest and need to provide a method, procedure and tool set for accurately locating these underlying rafter centers with precision and without damaging the roofing material in the process.

The structural attachment of a solar racking systems to underlying rafters will require multiple anchor points along parallel horizontal lines, vertically displaced from a roofs ridge, these structural attachments must meet or exceed a design pull-out strength requirement that is based on the anchor being centered in the structural member, A structural attachment attains its greatest pull-out strength when it is centered within the structural member, a loss of pull-out strength occurs for anchor point that are not within some variance of center, this variance is dependent on type of rafter, and type and size of anchor the *National Design Specifications (NDS)—for wood construction*, which are adopted in all model building codes in the U.S., requires an accuracy of "³⁄₁₆ths of an inch" left or right of true center for a ¼" lag bolt anchored into the 1½" face of a 2×4, before loss of pull out strength occurs, it is therefore a necessary requirement that the greatest accuracy be used in finding these rafter centers as they will ultimately define the pull-out strength of any anchor used in any structural attachment.

The most common methods in use to date for finding these Rafter centers are; looking at the overhang of the roof if exposed, and measuring and projecting the course of the rafters from there endpoints, this method introduces a large percentage of error due to the one reference point at the end of each rafter and the fact that rafters may not run true for the desired length needed which leads to drilling test holes to make corrections, another method involves using expensive high-density stud finders which often require the removal of roof shingles or tiles to reduce the distance between the stud finder and the rafter and to provide a smooth surface for scanning, another method involves tapping the roof with a mallet or hammer, one can hear a noticeably different sound when rafter is struck, compared with hitting the space between the rafters this method is highly dependent on the thickness and condition of the roof and the skills of the user and may not always be repeatable or accurate, another method used from inside the attic involves measuring and recording the distance from the outside wall to the center of the first rafter, then directly measuring and recording center to center measurements of all rafters intermediate to the last rafter needed to support the racking system these measurements can then be transferred one measurement at a time to the roof using the outside wall as a starting point this method is highly dependent on the inside and outside measurement of the outside wall which is usually different do to siding or the fact that the outside wall does not extend above the roof an error in this measurement will be repeated at each subsequent measurement transferred to the roof, the direct measuring and transferring of individual center to center measurement is also error prone and this error will be stacked and additive such that each transferred center will likely contain a greater error.

DESCRIPTION OF THE PRIOR ART

As described above these various methods have a large amount of inherent error and often require additional test holes to be drilled to confirm their accuracy and consequentially these test holes must then be sealed. In the prior art, however, there is a showing in U.S. Pat. No. 4,329,783 issued to Joseph A. Maresca of a hand tool for locating and measuring the location of inaccessible rafters and studs from outside of a roof or wall. The tool has a base plate and a tubular guide fixedly mounted at an angle to the base plate. A measuring rod appropriately marked with measurement indicia is a sliding fit into the bore of the guide. The tool is used by drilling a hole through the roof or wall, using the tubular guide as a drill guide, and then inserting the measuring rod into the guide and moving it until the tip of the rod encounters the side of a rafter or stud. After noting the measurement indicated on the rod, the rod and base plate are removed. The noted measurement will be the distance from the center line of the drilled hole to the centerline of the rafter or stud. There is also a showing in U.S. Pat. No. 2,992,488 issued to R. Barrett, of a wall stud or rafter finder which comprises an indicator and a bent tubular body the tool is used by first drilling a hole in the roof, inserting the bent tubular body into the hole and probing for a rafter. When a rafter is located the indicator marks one side of the rafter. Unlike the subject invention, both of the above inventions are intended to be used from the outside of a roof area and on only one rafter or stud at a time they also require a placement hole to be drilled through the roof for each rafter or stud to be located, and they only provide an offset reference point, were another measurement must still be made to locate the Rafter or studs true center.

SUMMARY OF THE INVENTION

In light of the afore mentioned problems associated with the prior devices, it is an object of the present invention to provide a Rafter Center Translation Tool Set that when used with a standard 25 ft tape measure and a common 6 inch $7/32^{nd}$ drill bit will provide for the center points of multiple rafters to be recorded as marks on a tape measures tape and then translated along parallel lines from the inside of a roof area to the outside of a roof area with no error, no drilling of test holes, no removal of shingles or roof tile, no measuring of a distance to an outside wall, and no special skills are needed. For horizontal spans of greater than 25 ft, this tool set can be used in a front to back fashion as many times as needed.

This tool set provides an inside and outside of a roof alignment reference for a $1^{st}$ Rafter Clip and $1^{st}$ Translation Plate to a first rafter on the inside of a roof and to a horizontally displaced $2^{nd}$ Rafter Clip and $2^{nd}$ Translation Plate to a last rafter on the inside of a roof though the use of the alignment guides and the drill bit, which is used to drill an alignment hole from the inside of the roof area to the outside, this alignment hole is parallel centered with the longitudinal centers of the rafters that the clips are attached to at each end of a horizontal displacement. This fixed offset allows the alignment hole to be drilled along the side of the rafters that the $1^{st}$ and $2^{nd}$ Rafter Clips are attached to, the offset is the same for each clip, it is added to the center indicating holes position on the 1st Rafter Clip on the inside of the roof and subtracted from the $1^{st}$ translation plates alignment holes position on the outside of the roof to get the center indicating holes position translated to above the underlying first rafters longitudinal center on the outside of the roof, this is repeated in an opposite manner at the end of the horizontal span by the $2^{nd}$ Rafter Clip and the $2^{nd}$ Translation Plate. The Tape Measure and its Tape with the marked recording of the spacing's of the intermediate rafter centers between the first and last rafters of the horizontal span is also taken thru this translation and therefore these spacing's of the longitudinal centers that were marked or recorded on the tape on the inside of the roof will indicate the longitudinal centers of the intermediate underlying rafters along the horizontal span on the outside of the roof. With reference to FIG. 2A and FIG. 3A the $1^{st}$ and $2^{nd}$ Rafter Clips have rafter centering and securing means in the form of there U shaped sections 22 and 25 respectively these U shaped sections are dimension to securely fit the nominal measurements of a standard 2×4 rafter on three sides, having a first side, a base with a 1½ inch width and center indicating hole ¾ of an inch from each side, and a second side once the $1^{st}$ Rafter Clip is attached to a first rafter and the $2^{nd}$ Rafter Clip is attached to an end rafter, a standard 25 ft tape measure with a 1½ inch width can be centered and secured by fully engaging and centering the belt clip of the tape measure onto the appropriate side of the U-shaped section 21 shown in FOG. 2B the $1^{st}$ Rafter Clips U-shaped section 21, holds the tape measure at a 90 degree angle to the longitudinal center of the rafter it is attached to and its tape extended horizontally from left to right until it can be secured under the tape support arms 7 shown in FOG. 31B and its end tab hooked over the end of the $2^{nd}$ Rafter Clip at the end of the horizontal run the tape measures tape crosses perpendicular to all intermediate rafters between the first and the last and this allows the rafter centers to be easily marked on the tape, with a non-permanent type marker or pencil, making a record of the spacing's between centers, a marking in this way will be preserved on the tape until purposely removed, the tape is then detached from the $2^{nd}$ Rafter Clip retracted, and then removed from the $1^{st}$ Rafter Clip. On the outside of the roof a horizontal line can be drawn between the two alignment holes in the roof, s extended a few inches in each direction so that when the translation plates are installed on the roof the extended lines can be seen through the alignment and center indicating holes the $1^{st}$ Translation Plates alignment hole is aligned with the alignment hole in the roof such that its center indicating hole is to the right of the alignment hole, it is then secured to the roof by a screw thru its center indicating Hole, the $2^{nd}$ Translation Plates alignment hole is aligned with the alignment hole on the left with its center indicating hole to the left of the alignment hole, it is then also secured to the roof by a screw thru its center indicating Hole, The Tape Measure with the marked Rafter spacing's is then centered and secured to the U shaped section 13 shown in FIG. 4B of the $1^{st}$ Translation plate, its marked tape is then extended from right to left horizontally across the roof until its end tab can be secured under the tape support arms 8 shown in FIG. 5B to the 2nd Translation Plate the marked rafter centers on the tape from inside the roof area are now visible on the outside of the roof where they can easily and accurately be used as references for the required anchor points of a solar racking systems.

It is thus a principle object of the invention to provide a hand tool system that can be used to locate, record, and translate multiple rafter centers along a horizontal line from an accessible roof area underlying a shingle/composition roof to above the decking of the roof where they can be easily marked on the shingles, with a significant reduction in the required number of roof penetrations necessary for accurately locating these rafter centers. It is a further object of the invention to provide a hand tool system whose accuracy is based on the geometry of a roof and the mathematical principle of translation. Another object of the invention is to provide a method and tool set which will ensures accuracy and a reduction in the number of roof penetrations even when used by an untrained person.

BRIEF DESCRIPTION OF THE DRAWINGS

In order that the present invention is fully understood it will now be described with reference to the following drawings; it should be understood, however, that this invention is not necessarily limited to the precise arrangement shown.

FIG. 2A is a side view of a 1$^{st}$ Rafter Clip;
FIG. 2B is a front view of a 1$^{st}$ Rafter Clip;
FIG. 2C is a top view of a 1$^{st}$ Rafter Clip;
FIG. 3A is a side view of a 2$^{nd}$ Rafter Clip;
FIG. 3B is a front view of a 2$^{nd}$ Rafter Clip;
FIG. 3C is a top view of a 2$^{nd}$ Rafter Clip;
FIG. 4A is a side view of a 1$^{st}$ Translation plate;
FIG. 4B is a front view of a 1$^{st}$ Translation plate;
FIG. 4C is a top view of a 1$^{st}$ Translation plate;
FIG. 5A is a top view of a 2$^{nd}$ Translation plate;
FIG. 5B is a front view of a 2$^{nd}$ Translation plate;
FIG. 5C is a side view of a 2$^{nd}$ Translation plate;
FIG. 6A is a front view of a tape support clip;
FIG. 6B is a side view of a tape support clip;
FIG. 6C is a top view of a tape support clip.

DETAILED DESCRIPTION OF THE PREFERRED EMBODIMENT

Figure 1:
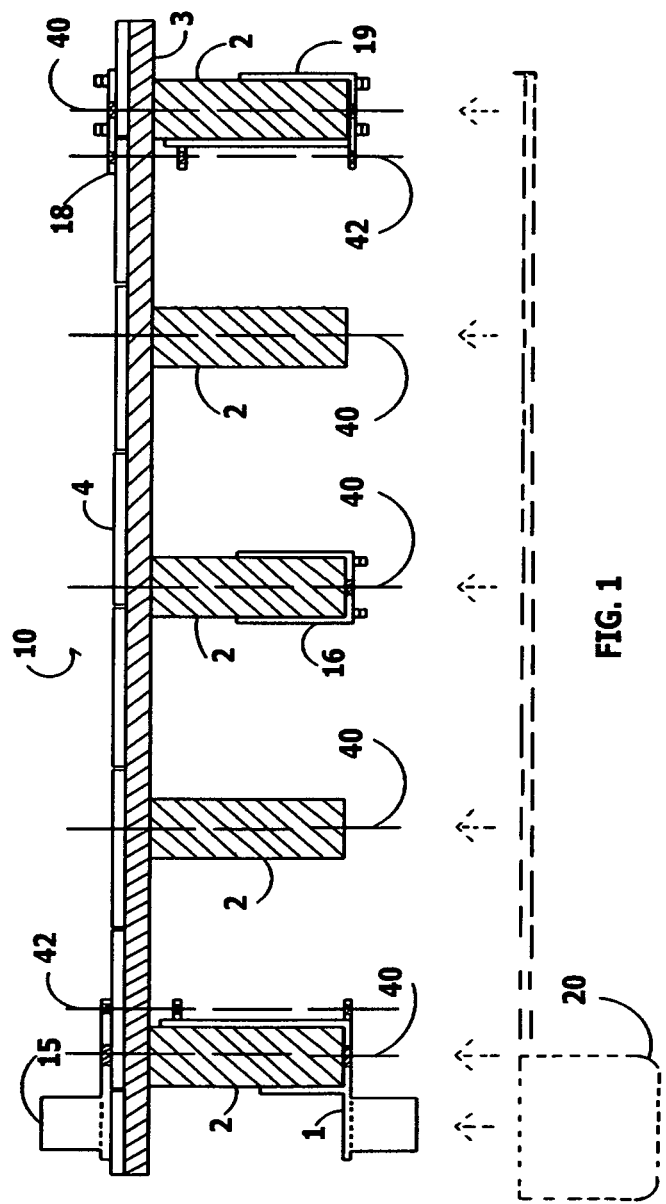
FIG. 1 is a cross-sectional front elevation view of a standard roof section, the Rafters 2 are on the inside of the roof. The Rafter Center Translation Tool Set's; 1$^{st}$ Rafter Clip 1, Tape Support Clip 16, and 2$^{nd}$ Rafter Clips 19 are used on the inside of a roof area, the 1$^{st}$ Translation Plate 15 and 2$^{nd}$ Translation Plate 18 are used on the outside of the roof.

The following description is provided to enable any person skilled in the art to make and use the invention and sets forth the best mode contemplated by the inventor of carrying out his invention. It should be understood, however, that the invention is not limited to the precise arrangement shown in FIG. 1 and that the emphasis on finding rafter centers herein is in no way intended as implying a limitation thereto.

FIG. 1 is a cross-sectional front elevation of a standard roof section the five rafters 2 are on the inside of the roof, the shingles 4 are on the outside of the roof, the Tru-Center Rafter Clip System 10 is attached to the Rafters 2 of the cross-sectional area of the roof, FIG. 1 shows five roof rafters 2, underlying a roof consisting of plywood 3 and shingles 4.

The Tru-Center Rafter Clip System of the present embodiment consist of five parts constructed from 20 ga galvanized steel sheets, that are CNC precision stamped and punched into flat blanks according to pattern layout sheets and then folded into clips.

In the following description where this embodiment is intended for use with standard rafters or 2×4 s of nominal profile dimensions of 1½"×3½" the corresponding U-shaped rafter sections will have a base of approximately 1½ inch width, the center indicating Holes which are centered within this base will therefore indicate the center of the rafter they are attached to, and a pan head screw driven through this hole secures the Rafter Clip to the rafter. The U-shaped sections that are designed to center and secure a standard 25 ft tape measure to the Rafter Clip are at right angles to the rafter that the rafter clip is attached to and will also will have a base of approximately 1½ inch width, with sides that fixedly sets its distance from the center indicating Hole by fully engaging and centering the tape measures belt clip around a side of the U-shaped section. FIG. 2A shows a side view of a 1$^{st}$ Rafter Clip where the U-shaped section 22 opening in a first direction and possessing some depth is designed to fit the profile of a standard rafter and the center indicating Hole 14 at its base, is centered within the U-shaped section, to the right of the U-shaped section, with a 1 inch offset and parallel centered are alignment guides 5, to the left of the center indicating Hole 14 in FIG. 2A is another U-shaped section designed to center and secure a standard 25 ft tape measure and whose depth is perpendicular to U-shaped section 22. FIG. 3A shows a 2$^{nd}$ Rafter Clip with U-shaped section 25 also possessing some depth and designed to fit the profile of a standard rafter and the center indicating Hole 11 at its base, centered within the U-shaped section, to the left of the U-shaped section, offset and parallel centered are alignment guides 6 above the center indicating Hole 11 are tape support arms 7. FIG. 4A shows a 1$^{st}$ Translation Plate with a U-shaped section 15 of some depth which is designed to center and secure a standard 25 ft tape measure, to the right of U-shaped section 15 is a center indicating Hole 12, and to the right of that with a 1 inch offset is an Alignment Hole 24. FIG. 5A shows a top view of a 2$^{nd}$ Translation Plate, with tape support arms 8, center indicating Hole 9 and Alignment Hole 26. FIG. 6A shows a Tape Support Clip with U-shaped section 30, a rafter center indicating Hole 28 and tape support arms 17.

Although shown and described in what is believed to be the most practical and preferred embodiment, it is apparent that departures from the specified method and design described will suggest themselves to those skilled in the art and may be made without departing from the spirit and scope of the invention. I, therefore, do not wish to restrict myself to the particular construction illustrated and described, but desire to avail myself of all modifications that may fall within the scope of the appended claims.

Having thus described my invention, what I claim is:

1. A hand tool system comprising:
a first rafter clip, said first rafter clip having a first plate with a first end and a second end, a first planar surface and a second planar surface, and a first longitudinal side edge and a second longitudinal side edge opposite said first longitudinal side edge, a second plate having a first end attached to said second end on said second planar surface of said first plate, said second plate also having a first planar surface and a second planar surface and extending substantially orthogonal from said first plate and terminating in a free distal second end, a third plate having a first end attached to said second planar surface of said first plate between said first end of said first plate and said second end of said first plate and extending substantially parallel to said second plate, a first flange connected along said first longitudinal side edge and a second flange connected along said second longitudinal side edge, said first flange and said second flange being attached on said first planar surface between said first end and said third plate and being substantially parallel to each other, a first ledge attached on said first planar surface of said second plate substantially at an intersection of said first plate and said second plate, a second ledge attached to said first planar surface of said second plate, a first aperture extending through said first plate and being between said second plate and said third plate, a second aperture extending through said first ledge and a third aperture extending through said second ledge and being in axial alignment with said second aperture;
a second rafter clip having a fourth plate having a first end and a second end, a first planar surface and a second planar surface, a fifth plate also having a first planar surface and a second planar surface and having a first end attached to said first end of said fourth plate on said second planar surface of said fourth plate and terminating in a free distal end, and a sixth plate having a first end attached to said second end of said fourth plate on said second surface, said fifth plate and said sixth plate of said second rafter clip being substantially orthogonal to said fourth plate of said second rafter clip and substantially parallel to each other, a third ledge attached on said first planar surface of said fifth plate substantially at an intersection of said fourth plate and said fifth plate, a fourth ledge attached on said first planar surface of said fifth plate, a fourth aperture extending through said fourth plate and being between said fifth plate and said sixth plate, a fifth aperture extending through said third ledge and a sixth aperture extending through said fourth ledge being in axial alignment with said fifth aperture, and a first set of two L-shaped hooks attached to said first planar surface of said fourth plate; and a tape support clip having a seventh plate having a first end and a second end, a first planar surface and a second planar surface, and a seventh aperture extending through said seventh plate and being between said first end and said second end, an eighth plate having a first end attached to said first end of said seventh plate on said second surface and a ninth plate having a first end attached to said second end of said seventh plate on said second surface, said eighth plate and said ninth plate being substantially orthogonal to said seventh plate and substantially parallel to each other, and a second set of two L-shaped hooks attached on said first planar surface of said seventh plate.

2. The hand tool system as in claim 1, further comprising:
a first translation plate, said first translation plate having a tenth plate with a first end and a second end, a first planar surface and a second planar surface, and a first longitudinal side edge and a second longitudinal side edge opposite said first longitudinal side edge, a first flange connected substantially at said first end of said tenth plate on said first planar surface along said first longitudinal side edge of said tenth plate and a second flange connected along said second longitudinal side edge on said first planar surface of said tenth plate and being substantially parallel to said first flange of said tenth plate, a fifth ledge attached to said second end of said tenth plate, an eighth aperture extending through said tenth plate between said first end and said second end of said tenth plate, and a ninth aperture extending through said fifth ledge; and a second translation plate having an eleventh plate having a first end and a second end, a first planar surface and a second planar surface and a tenth aperture between said first end and said second end of said eleventh plate and extending therethrough, a sixth ledge attached at said first end of said eleventh plate and having an eleventh aperture extending therethrough, and a third set of two L-shaped hooks attached to said first planar surface of said eleventh plate.

3. The hand tool system of claim 2, wherein a longitudinal distance between said flanges, said first aperture, and said second and third axial aligned apertures of said first rafter clip coincide with a corresponding longitudinal distance between said flanges, said eighth aperture, and said ninth aperture of said first translation plate when said system is in an installed position.

4. The hand tool system of claim 2, wherein longitudinal distances between said axial aligned apertures, said sixth aperture, and said L-shaped hooks of said second rafter clip coincide with corresponding longitudinal distances between said tenth and eleventh apertures and said L-shaped hooks of said second translation plate when said system is in an installed position.

5. The hand tool system of claim 1, wherein said second planar surface between said second and third plate of said first rafter clip forms a base of a U-shaped channel opening perpendicular to a longitudinal of said first plate.

6. The hand tool system of claim 1, wherein said first planar surface between said first and second flange of said first rafter clip forms a base of a U-shaped channel opening longitudinal along said first plate and is configured to receive the body of a tape measuring device.

7. The hand tool system of claim 1, wherein said second planar surface between the said eighth and ninth plate of said tape support clip forms a base of a U-shaped channel, and said second set of L-shaped hooks support a tape measure tape perpendicular to a structural member when said system is in an installed position.

\* \* \* \* \*